United States Patent [19]

Noh

[11] 4,352,324
[45] Oct. 5, 1982

[54] FRYING PAN WITH A REMOVABLE GREASE CATCHER

[76] Inventor: Edwin C. S. Noh, 628 Pana Pl., Honolulu, Hi. 96816

[21] Appl. No.: 205,664

[22] Filed: Nov. 10, 1980

[51] Int. Cl.³ .............................................. A47J 37/10
[52] U.S. Cl. ..................................................... 99/425
[58] Field of Search ................. 99/425, 422, 375, 426; D7/95; 126/390

[56] References Cited

U.S. PATENT DOCUMENTS

| | | | |
|---|---|---|---|
| 1,447,813 | 3/1923 | Patrick | 99/425 |
| 2,157,303 | 5/1939 | Penrose | 99/425 |
| 2,175,333 | 10/1939 | Wilson | 99/425 |
| 3,847,068 | 11/1974 | Beer | 99/425 |

*Primary Examiner*—Billy J. Wilhite
*Attorney, Agent, or Firm*—George W. T. Loo

[57] ABSTRACT

A frying pan with a removable grease catcher which will prevent the accumulation of hot cooking oil or grease and which can be used to fry various types of food without washing the frying pan. The frying pan includes a base with a frying surface, a flared side wall, a bottom annular flange, a handle, a handle brace which is secured to the flared side wall, a flanged lip, and a grease catcher. The grease catcher is removably secured to the bottom annular flange by the interaction of two spaced screws secured to the bottom annular flange and two keyhole openings in flanges located on each side of the container of the grease catcher. The keyhole openings face in the same direction and are spaced so that its wide portion is in registry with the two screws. The flanged lip extends from the bottom of the grease opening into the grease catcher. The grease opening and the grease catcher are centrally located with respect to the handle.

2 Claims, 4 Drawing Figures

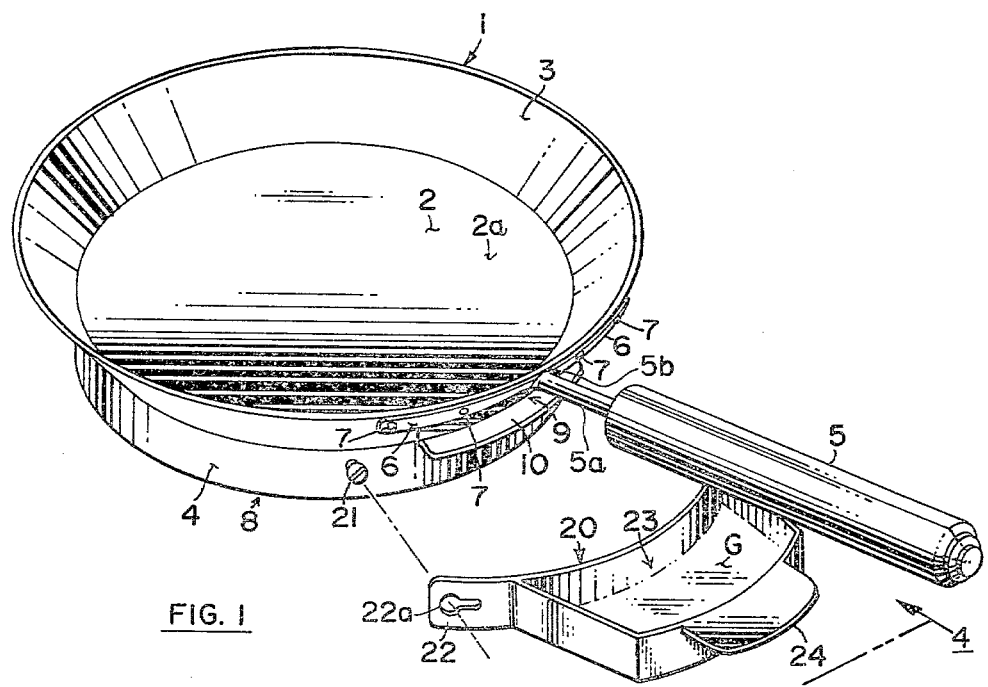
FIG. 1
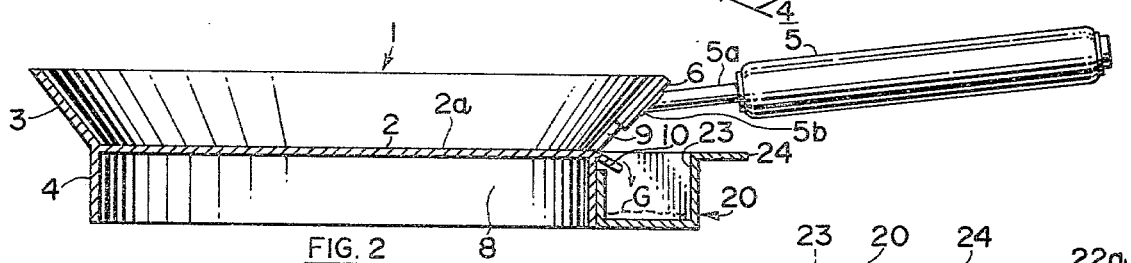
FIG. 2
FIG. 4
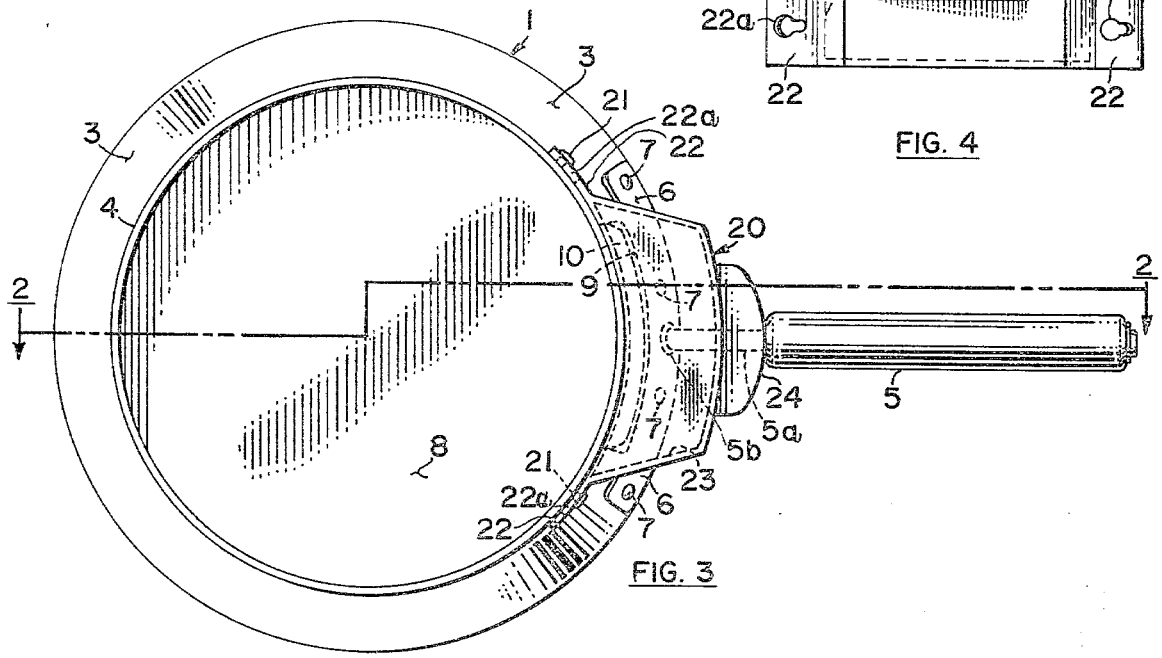
FIG. 3

FRYING PAN WITH A REMOVABLE GREASE CATCHER

BACKGROUND OF THE INVENTION

1. Field of Invention

This invention relates to a frying pan with a removable grease catcher.

2. Description of the Prior Art

Present frying pans have grease catchers which are not removable. When the grease catcher is not removably secured to the side of the frying pan, the accumulated cooking oil will heat and then smoke. Also it is difficult to pour the hot cooking oil from the grease catcher into another container because a person has to carry the frying pan with the grease catcher.

3. Disclosure Statement

Patrick, U.S. Pat. No. 1,447,813, dated Mar. 6, 1923, discloses a frying pan with a riveted grease collecting pan. The radially disposed recesses 15 permit juices and renderings from food materials cooking on concavo convex base 11 to flow through openings 25 and 26 for collection within pot 20. Since there is no flat base, the number and type of food that may be cooked on base 11 is limited. Since pot 20 is riveted on, cooking oil can seep through the riveted area. Also since the pot is secured to side wall 13, when extensive cooking is done, the cooking oil will accumulate in the pot and will be hazardous to pour the hot cooking oil into another container. Moreover, since the pot is not aligned with handle 16, the frying pan is not balanced and is awkward to handle.

Beer et al., U.S. Pat. No. 3,847,068, dated Nov. 15, 1974, discloses a self-draining frying pan having a base 12 with a convex frying surface 14 for frying food. It has a peripheral grease channel 16 for collecting fat or grease from frying food, circumferentially disposed about the frying surface 14. When heat is applied to the frying pan, the cooking oil in the grease channel 16 will heat and then smoke. Extensive cooking will cause the overheated cooking oil to create a fire.

My invention will prevent hot cooking oil from overheating as the grease catcher is removably attached to the bottom flange, a position away from the frying surface. Also it will allow the accumulated oil to be disposed readily.

My invention is disclosed in document entitled "Disclosure Document", No. 092802, received in U.S. Patent and Trademark Office on July 28, 1980.

SUMMARY OF THE INVENTION

This invention relates to a frying pan with a removable grease catcher that can be used fry various types of food without washing the frying pan.

An object of this invention is to provide a frying pan with a removable grease catcher which can be used to fry various types of food without washing the frying pan by wiping excess oil into the grease catcher with a dry cloth or a paper towel.

Another object of this invention is to provide a frying pan with a removable grease catcher with a flared side wall which will prevent cooking oil from splattering out of the frying pan when in the process of frying.

A further object of this invention is to provide a frying pan with a removable grease catcher with a bottom flange which will fit over any electric, gas, kerosene or other cooking element to prevent heat from escaping from the cooking unit.

Still another object of this invention is to provide a frying pan with a removable grease catcher wherein the grease catcher is removable secured to the bottom flange and is centrally located below the handle, so as to balance the weight of the frying pan when lifting or carrying it.

A still further object of this invention is to provide a frying pan with a removable grease catcher with an opening in the flared side wall to prevent hot cooking oil from accumulating and from splattering when cooking bacon, pork chops, and the like.

Another object of this invention is to provide a frying pan with a removable grease catcher which will cut down on the cholesterol from animal fats when frying bacon, pork chops, and the like.

A further object of this invention is to provide a frying pan with a removable grease catcher which will prevent grease from clogging the kitchen sink by making it easy to pour the accumulated cooking oil into a trash bin.

Other objects, features and advantages of the present invention will be readily apparent from the following detailed description taken in connection with the accompanying drawing.

BRIEF DESCRIPTION OF THE DRAWING

FIG. 1 is a perspective view of the frying pan with the removable grease catcher shown in an aligned but unattached position.

FIG. 2 is a sectional view taken on line 2—2 of FIG. 3.

FIG. 3 is a bottom plan view of the invention.

FIG. 4 is a front elevational view of the removable grease catcher taken on line 4—4 of FIG. 1.

DESCRIPTION OF THE PREFERRED EMBODIMENT

Before explaining the present invention in detail it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing wherein like reference numerals refer to like and corresponding parts throughout the several views, the preferred embodiment of the invention disclosed in FIGS. 1-4 inclusive is a frying pan 1. Frying pan 1 includes a base 2 with a frying surface 2a, a flared side wall 3, a bottom flange 4, a handle 5, a handle brace 6, rivets 7, a bottom opening 8, a grease opening 9, a flanged lip 10, a grease catcher 20, and screws 21. Reference letter G denotes grease.

Handle 5 includes a shaft 5a which is secured to handle brace 6 at 5b. Handle 5 is secured to the flared side wall 3 by means of handle brace 6 and rivets 7 or other suitable fastening means.

Grease catcher 20 includes flanges 22 with keyhole openings 22a, a grease container 23, and a grease catcher handle 24. The keyhole openings 22a face in the same direction. See FIG. 4.

Screws 21 are secured to the bottom flange 4 at the same level and at a distance apart which is equal to the distance between the centers of the wide portion of the keyhole openings 22a. In FIG. 4, the wide portion of keyhole openings 22a is to the left of the narrow portion.

Grease catcher 20 is removably attached to bottom flange 4 by aligning keyhole openings 22a with screws 21 as shown in FIG. 1. Then moving grease catcher 20 towards screws 21 until screws 21 are within the wide portion of keyhole openings 22a. Then moving grease catcher 20 in a clockwise direction as far as it will go so that screws 21 fit within the narrow portion of keyhole openings 22a.

Grease catcher 20 is removed from bottom flange 4 by moving grease catcher 20 in a counterclockwise direction so that screws 21 will be aligned with the wide portion of keyhole openings 22a. Then moving grease catcher 20 away from bottom flange 4.

Grease catcher handle 24 makes it easy to attach and to detach grease catcher 20 from bottom flange 4 as stated above. It also makes it easy to carry grease catcher 20 with accumulated cooking oil or grease to a trash bin for disposal of the accumulated cooking oil or grease in a plastic bag or in the trash bin.

Flange lip 10 serves as a bridge for the cooking oil between grease opening 9 and grease catcher 20. It extends from the bottom of grease opening 9 into grease catcher 20. It allows cooking oil to flow from the frying surface 2a through grease opening 9 into grease catcher 20.

Frying pan 1 may be formed from conventional heat conducting material such as iron, aluminum, copper, stainless steel, or the like. Handle 5 may be formed from conventional heat insulating material, such as wood or ceramic. In the preferred embodiment, frying pan 1 is made of cast iron. Base 2, flared side wall 3, and bottom flange 4 are cast molded. Handle 5 is made of hardwood with shaft 5a made of a steel rod. One end of shaft 5a is welded to handle brace 6 at 5b. Handle 5 is secured to flared side wall 3 by means of rivets 7 and handle brace 6. Grease catcher 20 is made of cast iron or mild steel.

My invention can be used to fry various types of food in succession without washing the frying pan. After frying one type of food, another type of food may be fried by merely wiping the excess oil or grease into removable grease catcher 20 with a dry cloth or a paper towel. By wiping the frying surface 2a clean with a dry cloth or a paper towel, the flavor of the previously fried food will not be present. If it is deemed desirable, frying surface 2a may coated lightly with cooking oil prior to frying.

Flared side wall 3 prevents cooking oil or grease from splattering out of frying pan 1 when it is used in frying. Bottom flange 4 is designed to fit over any electric, gas, kerosene or other cooking element to prevent heat from escaping from the cooking element. Grease catcher 20 is centrally located below handle 5 so as to balance the weight of the frying pan 1 when lifting or carrying the frying pan.

My invention prevents the accumulation of grease as the grease will drain into grease catcher 20. The prevention of grease accumulation results in fried food that is less fatty, more tastier, and less shrunk. As you know, food fried in liquid fat is unsightly and detrimental from a dietary point of view. Thus, the cholesteral from animal fats will be cut down when frying bacon, pork chops, sausages, hamburgers, or sausage patties.

With my invention, there is no need in pouring the grease into the kitchen sink and clogging it as it is easy to pour the grease into a plastic bag and putting the bag in the trash container.

Frying surface 2a may be made concave or dome shaped, if it is deemed desirable to facilitate the draining of the grease into grease catcher 20.

The provision of a grease catcher which is removably located below frying surface 2a and on bottom flange 4 results in the safe accumulation of grease. The accumulated grease will not heat appreciably and will not smoke or create a fire. The provision of a removable grease catcher which is attached to the bottom flange acts as an insulation so that the accumulated grease will not heat appreciably and will not smoke. This is in contrast with frying pans with nonremovable grease catcher in which accumulated grease will start to heat and then smoke. With extensive cooking, the smoking grease will create a fire. Thus, my invention is safe to use to accumulate grease.

Although but a single embodiment of the invention has been disclosed and described herein, it is obvious that many changes may be made in the size, shape, arrangements, color and detail of the various elements of the invention without departing from the scope of the novel concepts of the present invention.

I claim as my invention:

1. A frying pan with a removable grease catcher comprising a base with a frying surface, a flared side wall, a bottom flange, a handle, a handle brace, means to secure the handle to the flared side wall, a grease opening in the flared side wall, a flanged lip at the bottom of the grease opening, a grease catcher, and means to removably secure the grease catcher to the bottom flange; the grease opening is centrally located with respect to the handle, the flanged lip extends from the bottom of the grease opening into the grease catcher, and the grease catcher is centrally located with respect to the grease opening; and the means to removably secure the grease catcher includes two flanges with keyhole openings and two screws, one flange is connected to each side of the container of the grease catcher and the keyhole openings face in the same direction, and the two screws are secured to the bottom flange in a location so that they will be in alignment with the wide portion of the keyhole openings and so that when the grease catcher is removably secured to the bottom flange, the top of the grease catcher will be no higher than the base.

2. The frying pan with a removable grease catcher of claim 1, wherein the grease catcher includes a grease container and a grease catcher handle and the grease catcher handle is centrally located near the top portion of the outer side of the grease container.

* * * * *